United States Patent

Hatano et al.

[11] Patent Number: 5,805,243
[45] Date of Patent: Sep. 8, 1998

[54] LIQUID CRYSTAL PROJECTOR USING A SPATIAL LIGHT MODULATOR AND TWO ROTATING COLOR FILTERS

[75] Inventors: Akitsugu Hatano; Hiroshi Hamada, both of Nara, Japan

[73] Assignee: Sharp Kabushiki Kaisha, Osaka, Japan

[21] Appl. No.: 628,475

[22] Filed: Apr. 5, 1996

[30] Foreign Application Priority Data

Apr. 6, 1995 [JP] Japan .................................. 7-081555

[51] Int. Cl.⁶ .......................... G02F 1/1335; G02F 1/135; G03B 21/32; G03B 21/14
[52] U.S. Cl. .................................. 349/5; 349/7; 349/25; 349/106; 352/42; 353/84
[58] Field of Search .............................. 359/40, 41, 72; 349/5, 6, 106, 25, 7; 352/42; 353/84

[56] References Cited

U.S. PATENT DOCUMENTS

| | | | |
|---|---|---|---|
| 5,124,545 | 6/1992 | Takanashi et al. | 359/72 |
| 5,327,263 | 7/1994 | Katagiri et al. | 359/72 |
| 5,557,353 | 9/1996 | Stahl | 359/53 |

FOREIGN PATENT DOCUMENTS 3-17615  1/1991  Japan .

*Primary Examiner*—William L. Sikes
*Assistant Examiner*—Walter Malinowski
*Attorney, Agent, or Firm*—David G. Conlin; Peter F. Corless

[57] ABSTRACT

A liquid crystal display apparatus which includes: a light-addressed liquid crystal light valve including a photoconductive layer and a liquid crystal layer between a pair of light transmitting substrates, each of the light transmitting substrates having an electrode for applying a voltage across the photoconductive layer and the liquid crystal layer; a writing unit for writing an image of a display medium in the light-addressed liquid crystal light valve with writing light from the display medium through a writing lens; a projecting unit for projecting the image written in the light-addressed liquid crystal light valve by irradiating reading light from a projection light source to the light-addressed liquid crystal light valve; and a controlling unit for controlling at least one of operational characteristics of the light-addressed liquid crystal light valve and a luminance of the writing light in accordance with a luminance of the display medium, is disclosed.

2 Claims, 11 Drawing Sheets

LIQUID CRYSTAL PROJECTOR USING A SPATIAL LIGHT MODULATOR AND TWO ROTATING COLOR FILTERS

BACKGROUND OF THE INVENTION

1. Field of the Invention

The present invention relates to a liquid crystal display apparatus, and more particularly, to a liquid crystal display apparatus which uses a light-addressed liquid crystal light valve and is suited to a projection display, a display for presentation, an overhead projector, or the like.

2. Description of the Related Art

A projection display which projects and displays an image written, for example, in a light-addressed liquid crystal light valve (hereinafter referred to as a light-addressed LCLV) has been known as a conventional liquid crystal display apparatus. As such apparatuses, those using a luminescent display medium such as a CRT (cathode ray tube) or a flat panel display as a unit of writing (input) an image in the light-addressed LCLV have been known.

The projection display which performs an image writing by a CRT has a structure illustrated in FIG. 10. An image (writing light or addressing light) displayed on a CRT 101 is written in a photoconductive layer of the light-addressed LCLV 103 via a writing lens 102. On the other hand, light (reading light) emitted from a projection light source 105 enters a polarization beam splitter 104. A P-polarized light of this incident light passes through the beam splitter 104, and an S-polarized light is reflected at a right angle from the direction of propagation by the beam splitter 104 and reflected by the LCLV 103. When the S-polarized light is reflected, if an image has been written in the LCLV 103, the polarization of the light incident on the image-written region changes in accordance with the orientation state of liquid crystal molecules so as to include a P-polarized light. Therefore, the P-polarized light which has been reflected by the LCLV 103 can pass through the beam splitter 104. By projecting this light on a screen 107 via a projecting lens 106, the image is displayed.

A general configuration of the above-mentioned LCLV 103 includes, as shown in FIG. 11, glass substrates 111a and 111b on both sides, and provided therebetween are a transparent electrode 112a, a photoconductive layer 113, a light blocking layer 114, a dielectric mirror 115, an alignment layer 116a, a spacer 117, a liquid crystal layer 118, an alignment layer 116b, and a transparent electrode 112b arranged in this order from the glass substrate 111a side. As a display mode for the LCLV 103, a hybrid field effect (HFE) mode, a surface stabilized ferroelectric liquid crystal (SSFLC) display mode, a field effect mode where nematic liquid crystals are homeotropically oriented so as to be tilted several degrees relative to the vertical, or the like is used.

A voltage is applied between the transparent electrodes 112a and 112b by an AC (alternating current) power source 119 for the LCLV 103 to operate as follows. When writing light WL enters through the glass substrate 111a, impedance of the photoconductive layer 113 in regions irradiated by the light (bright state regions) decreases and, consequently, the voltage supplied from the AC power source 119 is applied to the liquid crystal layer 118. On the other hand, impedance of the photoconductive layer 113 in regions not irradiated by the light (dark state regions) does not change but stays high and, consequently, the voltage is not applied to the liquid crystal layer 118. An image corresponding to a spatial intensity distribution of the writing light WL is thus formed due to the differences between these bright state regions and dark state regions. Therefore, it becomes possible to write an image in the LCLV 103 by the CRT 101 in the configuration shown in FIG. 10, and a projection display using this LCLV can be performed.

An apparatus performing a color display projection by above-mentioned projection display has a configuration shown in FIG. 12. Light emitted from a reading light source 125 made of a xenon lamp is separated into R (red), G (green), and B (blue) light beams and reflected by dichroic mirrors and mirrors 127a, 127b, and 127c with a condenser lens 126 being placed therebetween and directed to polarization beam splitters 124a, 124b, and 124c. P-polarized lights of the incident R, G, and B light beams pass through the beam splitters 124a, 124b, and 124c. On the other hand, S-polarized lights are reflected at a right angle from the direction of propagation by the beam splitters 124a, 124b, and 124c and reflected by the LCLVs 123a, 123b, and 123c. In this case, images respectively corresponding to the R, G, and B images are written in the LCLVs 123a, 123b, and 123c by using CRTs for the R, G, and B images with writing lenses 122a, 122b, and 122c being placed therebetween. As described above, voltages corresponding to intensity distributions of writing light are applied to liquid crystal layers of the LCLVS 123a, 123b, and 123c and, consequently, orientations of liquid crystal molecules of the liquid crystal layers change corresponding to the applied voltages. S-polarized lights of the reading light incident on the LCLVs 123a, 123b, and 123c change their states of polarization in accordance with the state of orientation of the liquid crystal molecules. Therefore, the light, which passes through the liquid crystal layer, is reflected by the dielectric mirror, again passes through the liquid crystal layer, and then is emitted from the LCLV now including a P-polarized light. The p-polarized light reflected by the LCLVs can pass through the beam splitters 124a, 124b, 124c. These R, G, and B light beams are projected and combined on a screen 128 via projecting lenses for the R, G, and B light beams 126a, 126b, and 126c to produce a color image.

Also, as another example of an apparatus which projects and displays an image written in a light-addressed LCLV, an overhead projector for ordinary paper which uses a sheet of ordinary paper (non-luminescent display medium) in place of a CRT as a unit of writing an image is disclosed in Japanese Laid-Open Patent Publication No. 3-17615. In the publication, an image printed on a sheet of ordinary paper is imaged on an LCLV by an imaging lens in order to write the image. The written image is projected on a screen by having light from a reading light source incident on the reading side of the LCLV and by having the reflected light focused on the screen through a projecting lens.

An example of a projection display which does not use a light-addressed LCLV includes a liquid crystal projector using a transmission type liquid crystal panel and an overhead projector (OHP) for a transparent film. A conventional overhead projector for a transparent film includes a text projection table, a projection light source, and a projecting lens. Light from the projection light source is irradiated on a transparent film placed on the text projection table, and the light is enlarged and projected on a screen through the projecting lens. A transparent film is used as a projecting text in this case.

Also, instead of a transparent film, a liquid crystal projection panel for an OHP using a transmission type liquid crystal panel, which is to be placed on the text projection table of the OHP for a transparent film, has been developed and is commercially available. This liquid crystal projection panel for an OHP is constructed such that image information can be displayed by electrical signal inputs from computers or videos connected thereto via specially designed interfaces. A text made of ordinary paper or a 3-dimensional object is first taken into a computer by an image scanner or a CCD camera and, then enlarged and projected by using the liquid crystal projection panels for an OHP for a presentation with an OHP for a transparent film.

As a liquid crystal projector, a color image is enlarged and projected by using a single or three transmission type liquid crystal panels. Electrical signals for an image from a video or computer is input to the liquid crystal panel via specially designed interfaces. The liquid crystal panel is then driven in response to the input electrical signals for an image to display an image.

However, problems exist in the case of above-described conventional art. That is, a projection display using a light-addressed LCLV or an OHP for ordinary paper can only project an image of a display medium of a predetermined type. For example, the projection display is designed for images on a CRT or flat panel display (luminescent display medium) and the OHP for ordinary paper is designed for images on a sheet of ordinary paper (non-luminescent display medium). This is because they are designed so that the brightness of the display medium and the photosensitivity of the light-addressed LCLV are matched and, if the brightness of the display medium differs, the projected image becomes dark or the contrast becomes low when an image is written in the LCLV and subsequently read. Furthermore, the OHP for ordinary paper disclosed in Japanese Laid-Open Patent Publication No. 3-17615 does not include a unit of displaying a color image, but instead is capable only of monochromatic display.

Moreover, although a conventional OHP for a transparent film gives a very bright display, its use is limited to a transparent film as a display medium for image input as described above. Consequently, switching of display images in real time during a presentation is not possible, resulting in poor operability. In order to overcome these difficulties, a liquid crystal projection panel for an OHP using a transmission type liquid crystal panel as a display medium in place of a transparent film has increasingly been used for an OHP for a transparent film. This liquid crystal projection panel for an OHP makes it possible to switch display images in real time, improving the operability. However, problems associated with dark displays are due to a low transmittance of the panel still remain. Furthermore, in order to display an image using the liquid crystal projection panel for an OHP, it is necessary to include a variety of specially designed interfaces for the projection panel for connection to computers, or the like, which supply image signals, posing the problem of unreasonably high prices.

Also, even in a conventional liquid crystal projector, only an image displayed on a transmission type liquid crystal panel as a display medium for image input can be projected. Consequently, it is necessary to prepare image data in advance by a video or a computer. Furthermore, since the transmittance of the transmission type liquid crystal panel is low, the liquid crystal projector provides darker displays compared to an OHP for a transparent film using the same light source (lamp).

SUMMARY OF THE INVENTION

The liquid crystal display apparatus of this invention includes: a light-addressed liquid crystal light valve including a photoconductive layer and a liquid crystal layer between a pair of light transmitting substrates, each of the light transmitting substrates having an electrode for applying a voltage across the photoconductive layer and the liquid crystal layer; a writing unit for writing an image of a display medium in the light-addressed liquid crystal light valve with writing light from the display medium through a writing lens; a projecting unit for projecting the image written in the light-addressed liquid crystal light valve by irradiating reading light from a projection light source to the light-addressed liquid crystal light valve; and a controlling unit for controlling at least one of operational characteristics of the light-addressed liquid crystal light valve and a luminance of the writing light in accordance with a luminance of the display medium.

In one embodiment of the present invention, the liquid crystal display apparatus further includes a detection unit for detecting the luminance of the display medium, wherein the controlling unit changes the voltage applied across the photoconductive layer and the liquid crystal layer based on the detected luminance of the display medium.

In one embodiment of the present invention, the controlling unit changes a frequency of the voltage.

In one embodiment of the present invention, the liquid crystal display apparatus further includes a detection unit for detecting the luminance of the display medium, wherein the controlling unit changes the luminance of the writing light based on the detected luminance of the display medium.

In one embodiment of the present invention, the liquid crystal display apparatus further includes color separating units for separating the writing light and the reading light into three primary color beams in a time dividing manner.

In one embodiment of the present invention, each of the color separating units includes a rotating color filter including three primary color filters.

In one embodiment of the present invention, the liquid crystal display apparatus further includes; color separating units for separating the writing light and the reading light into three primary color beams, and color combining unit for combining three primary color beams reflected by the light-addressed liquid crystal light valve.

In one aspect of the invention, the liquid crystal display apparatus includes: a light-addressed liquid crystal light valve including a photoconductive layer and a liquid crystal layer between a pair of light transmitting substrates, each of the light transmitting substrates having an electrode for applying a voltage across the photoconductive layer and the liquid crystal layer; a writing unit for writing an image of a display medium in the light-addressed liquid crystal light valve with writing light from the display medium through a writing lens; a projecting unit for projecting the image written in the light-addressed liquid crystal light valve by irradiating reading light from a projection light source to the light-addressed liquid crystal light valve; and color separating units for separating the writing light and the reading light into three primary color beams in a time dividing manner.

In another aspect of the present invention, the liquid crystal display apparatus includes; a light-addressed liquid crystal light valve including a photoconductive layer and a liquid crystal layer between a pair of light transmitting substrates, each of the light transmitting substrates having an electrode for applying a voltage across the photoconductive layer and the liquid crystal layer; a writing unit for writing an image of a display medium in the light-addressed liquid crystal light valve with writing light from the display medium through a writing lens; a projecting unit for projecting the image written in the light-addressed liquid crystal light valve by irradiating reading light from a projection light source to the light-addressed liquid crystal light valve; color separating units for separating the writing light and reading light into three primary color beams; and a color combining unit for combining three primary color beams reflected by the light-addressed liquid crystal light valve.

The term "display medium" in the specification of the present application includes a luminescent display medium such as a flat panel display such as a CRT, a plasma display, and an LCD. The term also includes a non-luminescent display media such as a sheet of paper, a film for an OHP, and a 3-dimensional object. The luminescent display medium includes not only a self-luminescent (emission type) display device such as a CRT and a plasma display but also a non-luminescent display device such as an LCD which requires a separate light source.

Since a liquid crystal display apparatus includes a unit for controlling operational characteristics of a light-addressed liquid crystal light valve in accordance with brightness of a display medium, when an image of the display medium is written in the liquid crystal light valve by the writing unit, the operational characteristics of the liquid crystal light valve can be adjusted in accordance with brightness of display media of luminescent type and non-luminescent type. Consequently, both still pictures and moving pictures having good contrast can continually be projected brightly for any display medium.

Moreover, if a notebook computer is available, since the display screen thereof can be projected, specially designed interfaces are not required, unlike the case of a liquid crystal projection panel used on an OHP for transparent films. Consequently, the liquid crystal display apparatus can be constructed without considerably raising costs. Also, contrary to a liquid crystal projector or a liquid crystal projection panel for an OHP which produces a dark display because of low aperture ratio, a liquid crystal light valve does not have a pixel structure. As a result, when an image such as one on a sheet of ordinary paper is written, there is no decrease in brightness due to pixel aperture ratio and a bright display can be obtained.

Moreover, since a unit of separating light into three primary colors in a time dividing manner are provided both on the writing side and the projection (reading) side of a liquid crystal light valve, a color image display apparatus can be realized.

Moreover, rotating color filters having three primary colors are provided in optical paths on both the writing side and the projection (reading) side of a liquid crystal light valve, thereby making a color image display possible with the least number of parts to be added. Therefore, a liquid crystal color display apparatus can be constructed without considerably raising costs. Furthermore, by designing such that the rotating color filter can easily be removed from the optical path, a color display mode can be switched to a high luminescent black-and-white display mode and vice versa.

Moreover, since an apparatus includes a unit of separating light into three primary colors provided in an optical path of the writing unit and a unit of combining images read by three primary colors provided in an optical path of the projecting unit, color images can successively be displayed and a very bright liquid crystal color display apparatus can be constructed.

Thus, the invention described herein makes possible the advantages of (1) providing a liquid crystal display apparatus which is capable of projecting an image of a display medium of any kind without limitations regarding the display medium, and (2) providing a liquid crystal display apparatus which is capable of projecting large and bright displays both in black-and-white and in color.

These and other advantages of the present invention will become apparent to those skilled in the art upon reading and understanding the following detailed description with reference to the accompanying figures.

DESCRIPTION OF THE PREFERRED EMBODIMENTS

Hereinafter, examples of the present invention will be described with reference to figures.

Example 1

A first example of the present invention will be described below with reference to FIGS. 1 to 5.

Figure 1:
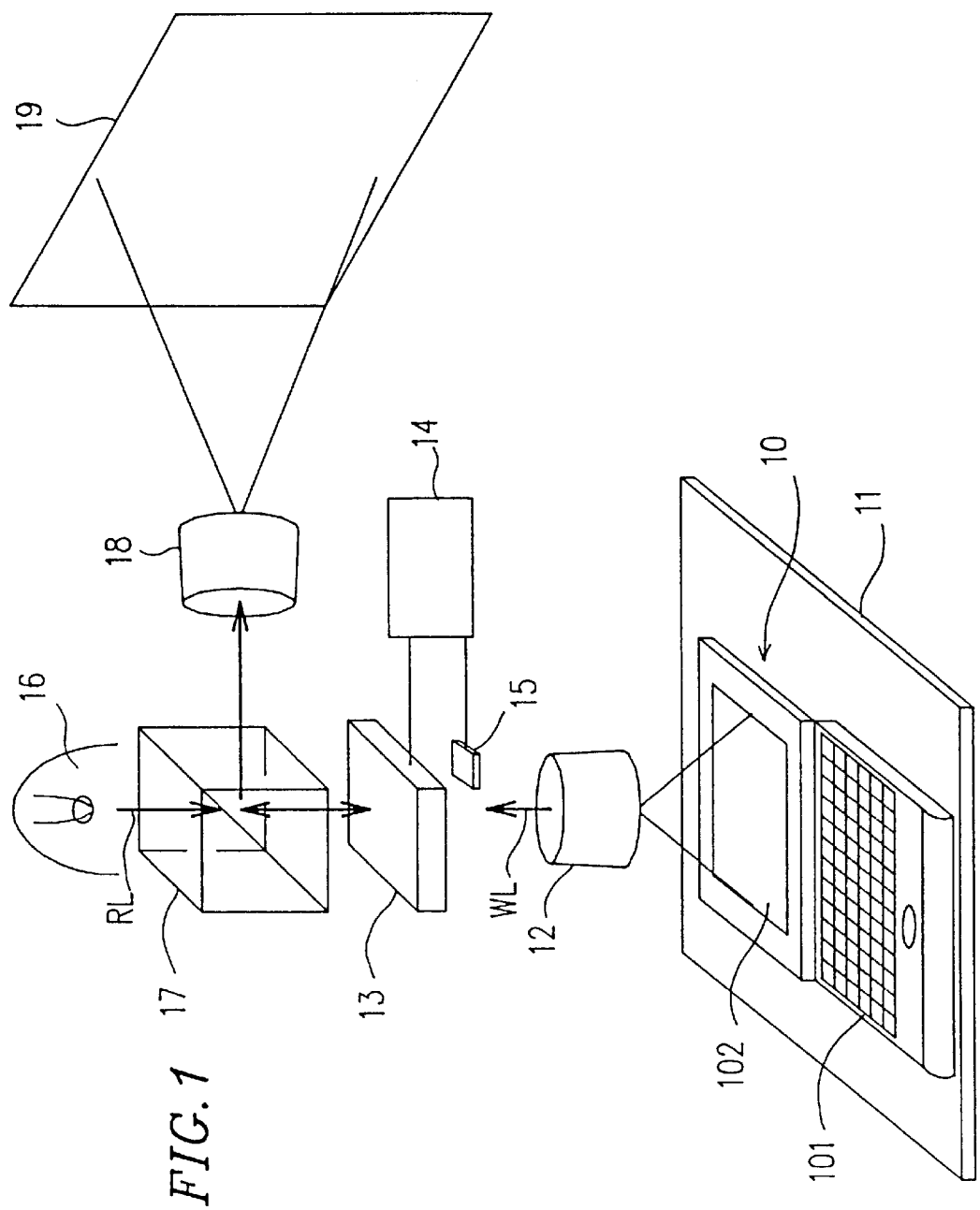
FIG. 1 illustrates a configuration of a liquid crystal display apparatus according to a first example of the present invention.

FIG. 1 shows a liquid crystal display apparatus of this example. The apparatus includes a light-addressed liquid crystal light valve (hereinafter referred to as a light-addressed LCLV) 13, a writing lens 12 for writing in the liquid crystal light valve 13 an image (writing light WL) of an arbitrary display medium 10 placed on a projection table 11, a photosensitivity controller 14 for controlling operational characteristics of the LCLV 13, a photosensor 15 for detecting luminance (an amount of light) from the display medium 10, a projection light source 16 emitting reading light (RL) for reading an image formed in the LCLV 13, a polarization beam splitter 17, and a projection lens 18. Light coming from the projection lens 18 is focused on a screen 19.

In the first example, a display screen of a transmission type TFT-LCD 102 of a notebook computer 101 serves as an example of above-mentioned display medium 10. Here, LCD stands for a liquid crystal display and TFT stands for a thin film transistor which functions as a switching device for switching ON and OFF the pixels of the LCD.

As the display medium 10, it is possible to use a reflection type LCD, an electro-luminescent (EL) display, a liquid crystal TV, a sheet of ordinary paper, a transparent film for an OHP, a 3-dimensional object, or the like instead of the transmission type TFT-LCD 102, and to project an image thereof.

Figure 2:
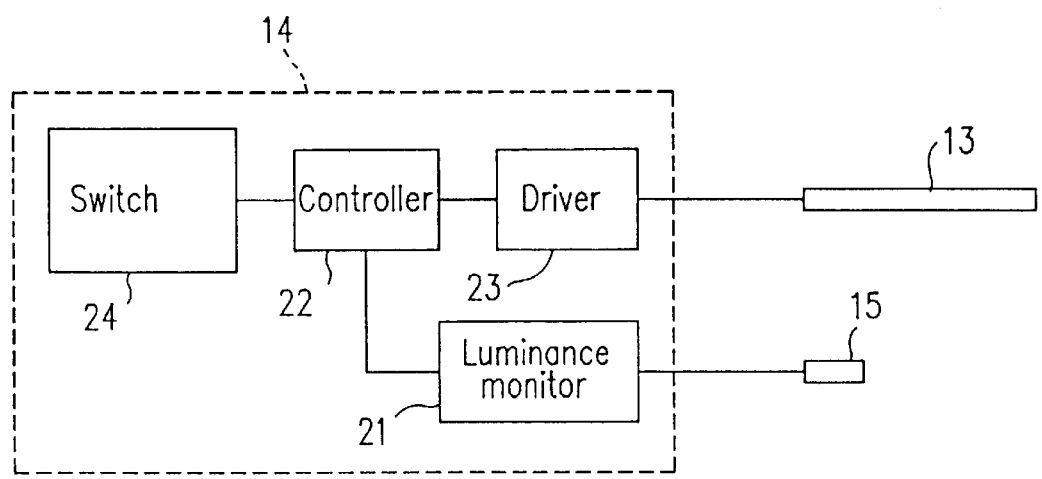
FIG. 2 is a conceptual diagram illustrating a configuration of a photosensitivity controller included in the liquid crystal display apparatus of the first example.

As shown in FIG. 2, the photosensitivity controller 14 includes a luminance monitoring circuit 21 which receives signals from the photosensor 15, a photosensitivity controlling circuit 22, a LCLV driver, 23, and an auto/manual switch 24. A luminance of writing light incident on the LCLV 13 is measured by the photosensor 15 which is positioned at an arbitrary location on the writing side of the LCLV 13, and an output signal corresponding to the measured value is received by the luminance monitoring circuit 21. The luminance monitoring circuit 21 transforms the received signal into a luminance signal and outputs to the photosensitivity controlling circuit 22. The photosensitivity controlling circuit 22 determines drive conditions to adjust and optimize the photosensitivity of the LCLV 13 in accordance with the luminance of the writing light, and outputs a controlling signal for that setting to the LCLV driver 23. The LCLV driver 23 sets up drive conditions such as a frequency and amplitude of a drive voltage for the LCLV 13 in response to the received controlling signal, and drives the LCLV 13 under a condition that the photosensitivity of the LCLV 13 is optimized.

Figure 3:
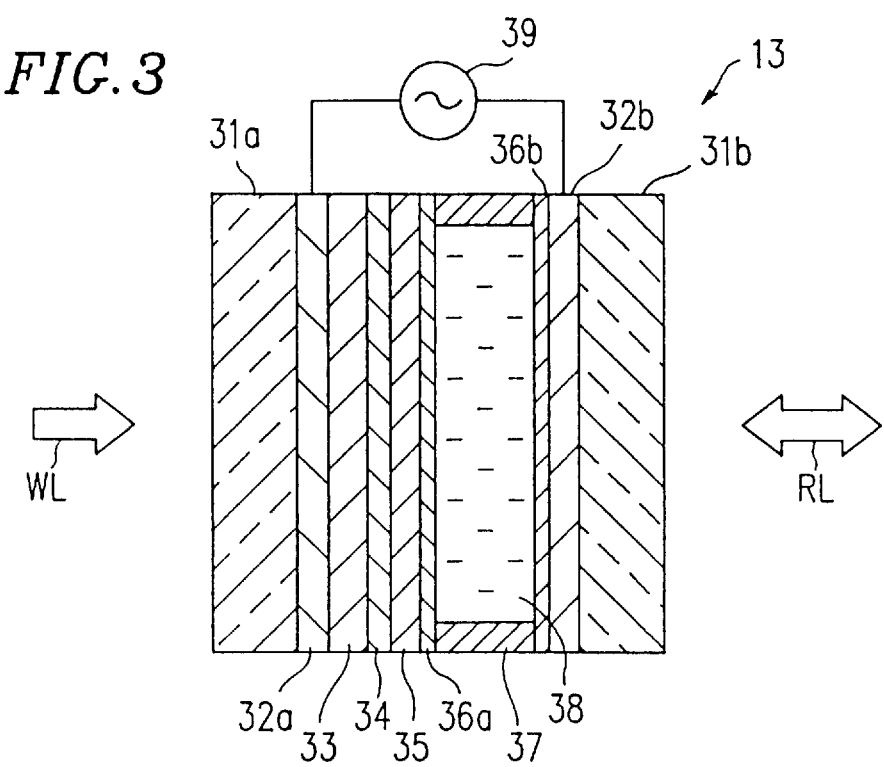
FIG. 3 is a cross-sectional view of a light-addressed liquid crystal light valve included in the liquid crystal display apparatus of the first example.

A cross-section of the light-addressed LCLV 13 is shown in FIG. 3. Transparent electrodes 32a and 32b made of an ITO (Indium Tin Oxides) transparent conductive film having a thickness of about 0.2 $\mu$m are formed on glass substrates 31a and 31h, respectively, by sputtering. The ITO transparent conductive films are formed on the substrates 31a and 31b by applying high frequency electric power in an environment including Ar and $O_2$ gases and sputtering an ITO target. Next, amorphous hydrogenated silicon carbide (a-SiC:H) is formed to a thickness of about 7 $\mu$m as a photoconductive layer 33 on the transparent electrode 32a by using reactive sputtering. The a-SiC:H film is produced by reactive sputtering of a silicon target with flows of argon gas (Ar), a hydrogen gas ($H_2$), and methane gas ($CH_4$). The ratio of the gases flow rate is Ar:$H_2$:$CH_4$ 10:3:1 and the substrate temperature is about 300° C. On the photoconductive layer 33, amorphous hydrogenated silicon tin (a-SiSn:H) is formed to a thickness of about 1.2 $\mu$m as a light blocking layer 34 by using reactive sputtering. The a-SiSn:H film is produced by reactive sputtering of a target which is formed by mixing silicon and tin with the molar ratio of 1:1 in Ar and $H_2$ gas environment. The partial pressure ratio of hydrogen $H_2/(H_2+Ar)$ is about 0.1 and the substrate temperature is about 280° C. Then, titanium dioxide ($TiO_2$) and silicon dioxide ($SiO_2$) are alternately laminated so as to form a dielectric mirror 35 such that a multilayer film made of a total of 30 layers is formed by using electron beam evaporation. The dielectric mirror layer is produced by alternately heating and evaporating $TiO_2$ and $SiO_2$ as evaporation materials at a substrate temperature of about 250° C.

Next, after polyamide films are formed as alignment layers 36a and 36b by a printing method, a molecular alignment treatment by rubbing is performed and the glass substrates 31a and 31b are put together with a spacer 37 interposed therebetween. A nematic liquid crystal material is injected and sealed to form a liquid crystal layer 38. Thus the light-addressed LCLV 13 is obtained. The cell thickness is about 4 $\mu$m. A hybrid field effect mode is used as the operational mode of the LCLV 13. The hybrid field effect mode is a display mode where a liquid crystal layer having 450 twisted orientation is used and a phenomenon that a polarization plane rotates in accordance with the twisted orientation of liquid crystal molecules is used. Other display modes used for reflection type liquid crystal display apparatuses can be used instead of the hybrid field effect mode.

Figure 4:
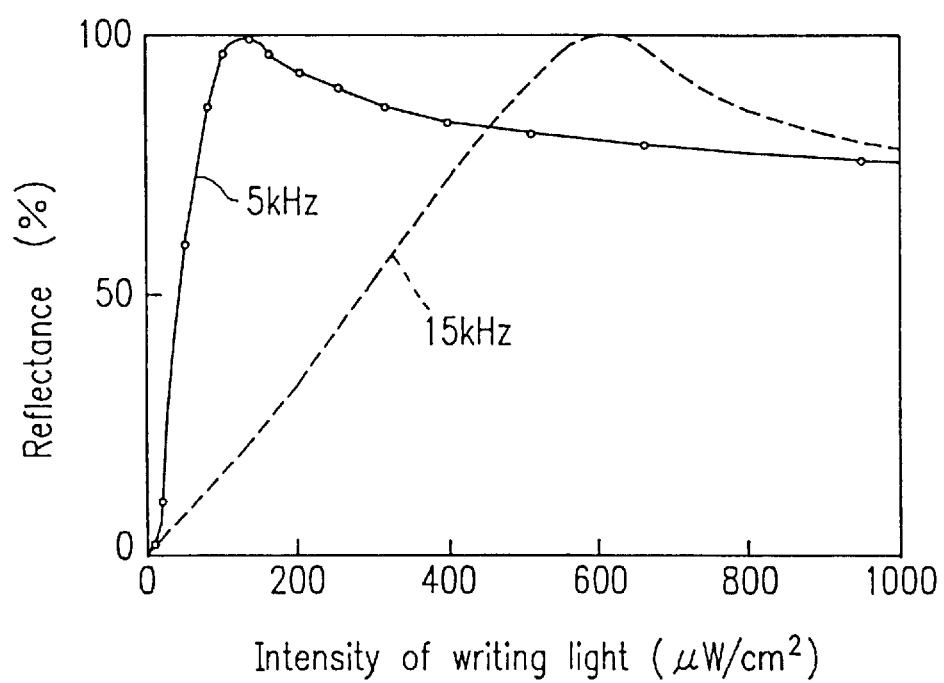
FIG. 4 is a graph illustrating a relationship between an intensity of writing light and a reflectance of the light-addressed liquid crystal light valve of FIG. 3.

FIG. 4 shows a relationship between a luminance (intensity) of writing light and a reflectance (relative value with the maximum reflectance being 100%) of the LCLV 13. In the figure, a solid line corresponds to a drive frequency of 5 kHz and a broken line to 15 kHz. It can be seen from the figure that as the luminance (intensity) of writing light increases, the reflectance increases, but beyond a certain value of the writing luminance (140 pW/$cm^2$ for a case of 5 kHz), the reflectance actually decreases as the luminance of writing light increases. Therefore, in a case where the writing light is too intense, the reading light produces an image with inverted gray scale, although the reading light is intense (high reflectance). In a case where the writing light is weak, the reading light is weak (low reflectance) and results in an image having low contrast. As a result, display quality is deteriorated. Therefore, it is understood that there exist optimizing values (optimization ranges) for the luminance of writing light incident on the LCLV 13.

Figure 5:
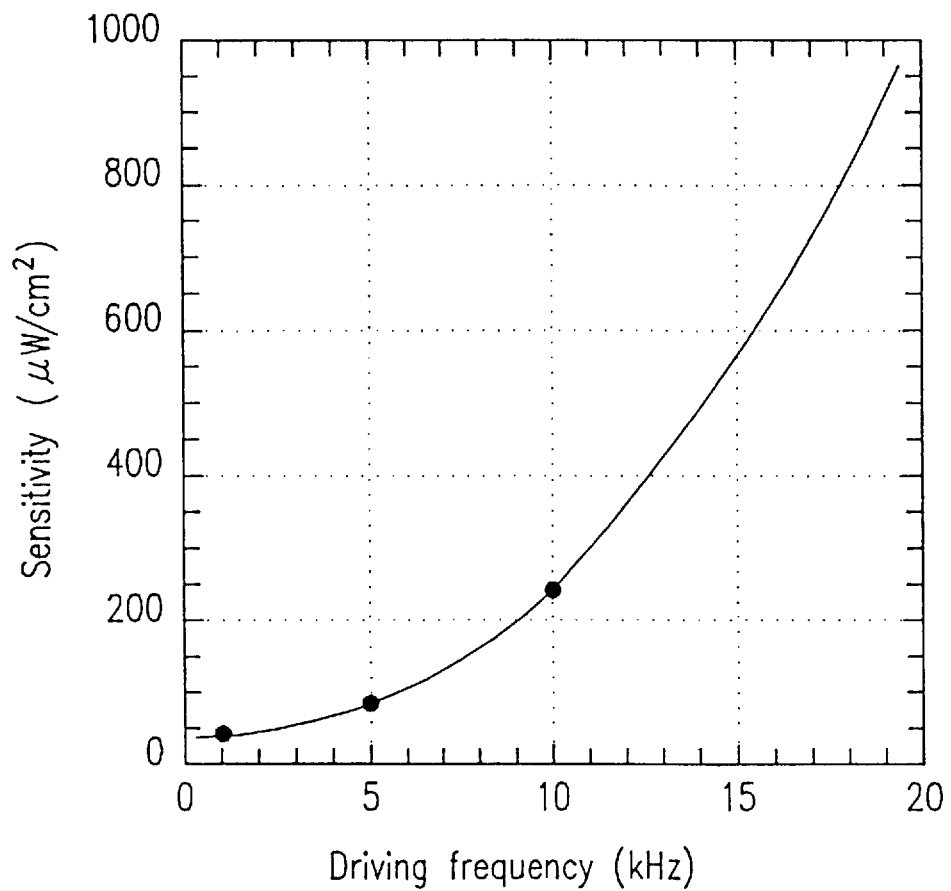
FIG. 5 is a graph illustrating a relationship between a drive frequency and a photosensitivity of the light-addressed liquid crystal light valve of FIG. 3.

Photosensitivity characteristics of the LCLV 13 is illustrated in FIG. 5. The photosensitivity of the LCLV 13 is represented by a luminance of writing light which leads to a 90% reflectance of the maximum reflectance obtained in the relationship between the writing luminance and the reflectance of the LCLV . This photosensitivity is a result of measured values under a condition that an amplitude of drive voltage is optimized so that the highest contrast of the LCLV is obtained for each frequency by varying the frequency of drive voltage for the LCLV. As can be seen from the figure, the photosensitivity of the LCLV can be controlled by controlling a frequency and an amplitude of the drive voltage. As a result, the photosensitivity can be matched with the luminance of writing light, and it becomes possible to produce a bright image display with high contrast.

In the liquid crystal display apparatus of the present example having the above-described configuration, writing light emitted from the display medium 10 (display screen of a transmission type TFT-LCD 102 in this example) illustrated in FIG. 1 enters the writing lens 12. The writing lens 12 includes a zoom mechanism and a focusing mechanism. By adjusting the writing lens 12 using those mechanisms in accordance with a physical extent and location of the display medium, the writing light from the display medium is focused so as to form an image on a writing region of the LCLV 13 in the -most suitable size.

Drive voltage, supplied by an AC power source 39, is applied between the transparent electrodes 32a and 32b of the LCLV 13. Impedance of a region of the photoconductive layer 33, which is irradiated by the writing light coming from the glass substrate 31a side (bright state region), decreases, and the drive voltage is applied to the liquid crystal layer 38. On the other hand, impedance of a region of the photoconductive layer 33 which is not irradiated by the writing light (dark state region) does not change, but instead stays high. Consequently, the voltage is not applied to the liquid crystal layer 38. Due to this difference between the bright state region and the dark state region, an image is written in the liquid crystal layer 38.

When an image is written as described above, the photosensitivity of the LCLV 13 is adjusted in accordance with a luminance of the writing light by the photosensitivity controller 14 shown in FIG. 2, and an excellent display with contrast is obtained. The auto/manual switch 24 makes it possible to adjust the photosensitivity either automatically or manually.

The photosensitivity can be adjusted, for example, as follows. It will be described in a case where the auto/manual switch 24 is set at auto.

The photosensor 15 measures a luminance of writing light from the display-medium 10 and outputs a signal corresponding to the luminance to the luminance monitoring circuit 21. The luminance monitoring circuit 21 transforms the received signal into a luminance signal and outputs to the photosensitivity controller 22. The photosensitivity controller 22 compares the measured luminance value and a plurality of predetermined reference luminance values based on the received luminance signal, selects a desired drive condition from a plurality of predetermined drive conditions based on a relationship obtained as a result of the comparison, and outputs a control signal indicating the selected drive condition to the LCLV driver 23. The LCLV driver 23 supplies drive voltage of the drive condition corresponding to the received control signal to the LCLV 13.

The reference luminance value may be predetermined by measuring luminance of light in advance for typical display media, on the other hand, a plurality of reference luminance values may be predetermined based on the operational characteristics of the LCLV (a relationship to a frequency or an amplitude of the drive voltage and the photosensitivity), and the operational characteristics of the LCLV may be set in accordance with a reference luminance value corresponding to a measured luminance value. For instance, if a measured luminance value is between 0 and 50 pW/cm$^2$ (e.g., for paper), then a frequency to be set is 3 kHz. Similarly, if the value is between 0 and 140 pW/cm$^2$ (e.g., for LCD), then a frequency is 5 kHz; if the value is between 0 and 600 pW/cm$^2$ (e.g., for CRT), then a frequency is 15 kHz; and if the value is between 0 and 700 pW/cm$^2$ (e.g., for OHP), then the frequency is 17 kHz.

For purposes of simplicity, cases where a TFT-LCD and a CRT are used as a display medium will be described. A reference luminance value of 100 (pW/cm$^2$) has been stored in a memory (not shown in the figure) of the photosensitivity controller 22 in advance. The photosensitivity controller 22 sets a drive frequency at 5 kHz in a case where a measured luminance value of the display medium is less than this reference luminance value, while it sets a drive frequency at 15 kHz in a case where a measured luminance value is equal to or greater than this reference luminance value.

If a measured value of the luminance from the TFT-LCD measured by the photosensor 15 is about 80 pW/cm$^2$, the photosensitivity controller 22 outputs a control signal to the LCLV driver 23 so as to set a frequency of the drive voltage at 5 kHz. With this drive condition, an image whose luminance is between 0 and 140 pW/cm$^2$ can be projected with excellent contrast (solid line in FIG. 4).

Now, the display medium 10 is switched to a CRT. If a measured value of a luminance from the CRT measured by the photosensor 15 is about 400 μW/cm$^2$, then the photosensitivity controller 22 outputs a controlling signal to the LCLV driver 23 so as to set a frequency of the drive voltage at 15 kHz. With this drive condition, an image from the display medium whose luminance is between 0 and 600 pW/cm$^2$ can be projected with excellent contrast (broken line in FIG. 4). In a case of manual adjustment of the photosensitivity, a frequency of the drive circuit is manually switched (in the above-described cases, switching is made between 5 kHz and 15 kHz). Here, a method of setting a frequency according to a luminance of light is described. However, if a frequency is switched, the optimum value of an amplitude of drive voltage for obtaining high contrast changes. Therefore, it is arranged so that a setting for the amplitude changes in response to the frequency such that a high contrast display can be obtained.

As described above, by adjusting photosensitivity of the LCLV in accordance with a luminance of light from the display medium 10, a display with high contrast can be projected regardless of the kind of display media.

It is preferable that photosensitivity (drive condition) of the LCLV be set based on the maximum luminance value incident on the LCLV. Therefore, it is preferable that the maximum luminance of the display medium is measured by using a 2-dimensional sensor such as a CCD as a photosensor which is capable of measuring a luminance spatial distribution and the photosensitivity is set based on the measured value. If the photosensor measures an average luminance value of a part or a whole of the display medium 10, the photosensitivity (reference luminance value) may be set while taking the luminance distribution of the display medium 10 into consideration.

Light emitted from the projection light source 16 made of a metal halide lamp enters the polarization beam splitter 17. A P-polarized light of this incident light passes through the beam splitter 17 and enters the LCLV 13, and an S-polarized light is reflected at a right angle from the direction of propagation by the beam splitter 17. Light entering the LCLV 13 is reflected by the dielectric mirror 35 of the LCLV 13. A part of this reflected light, which passes through a region of the liquid crystal layer 38 whose orientation state has been changed by the writing of an image, changes its polarization direction due to the orientation state of the liquid crystal layer and becomes an S-polarized light. Consequently, a part of the reflected light is reflected at a right angle by the beam splitter 17. Subsequently, this reflected light is enlarged by the projection lens 18 and, as a result, an image of the display medium 10 is projected on the screen 19, thereby displaying the image.

As described above, a liquid crystal displaying apparatus of the present example is capable of controlling operational characteristics of the LCLV 13 through a use of the photosensitivity controller 14 depending on the brightness of the display medium when an image of the display medium 10 is being written in the LCLV 13 by using the writing lens 12. For this reason, the LCLV 13 can be adjusted to the most suitable photosensitivity in accordance with the brightness of various kinds of display media including luminescent and non-luminescent display media, and therefore it is possible to realize an image projection which is always bright and has a good contrast. Also, unlike a liquid crystal projector or an active matrix LCD used in a liquid crystal projection panel for an OHP which have a low aperture ratio thus resulting in dark displays, an LCLV does not have a pixel structure. Consequently, when an image from a sheet of ordinary paper or the like is written, brightness does not decrease due to a pixel aperture ratio and a bright display can be obtained. Moreover, in comparison with a liquid crystal projection panel to be used with an OHP for a transparent film, if a notebook computer is available, a display screen thereof can be projected. Therefore, specially designed interfaces are not required and a liquid crystal display apparatus can be constructed without a large increase in production costs.

Also, when an ordinary OHF for a transparent film is used, if an image on a transparent film is small and the image is enlarged and projected on an entire screen, a luminance of projection light is limited and the projected display becomes dark. However, since the liquid crystal display apparatus of the present example is capable of writing an image from the display medium into an entire writing region of the LCLV 13 by using a zoom mechanism of the writing lens 12, a bright image is obtained on the projection screen without a decrease in the luminance of projection light. As a result, a bright image can be realized regardless of the physical extent of the display medium. Furthermore, by using a liquid crystal display as the display medium, a display of moving pictures can easily be realized.

Example 2

Another example of the present invention will be described below with reference to FIGS. 6 and 7. In order to facilitate the description, the same reference numerals are assigned to elements having the same functions as in the previous example and the description thereof will be omitted.

A liquid crystal display apparatus of this example includes a light-addressed LCLV 13, a writing lens 12 for writing an image on a display medium 10 placed on a projection table 11 (a display screen of d reflection type LCD 104 of a portable information terminal 103 is illustrated here as the display medium as an example) into the LCLV 13, a rotating color filter 61 as a unit of color separation, a set of a half mirror 63, a luminance controller 66, a photosensor 15, and a light attenuator 64 as a unit of controlling operational characteristics, a projection light source 16 as a reading unit, a polarization beam splitter 17, a projection lens 18, and a rotating color filter 62 as a unit of color separation of light from the projection light source 16. Light coming from the projection lens 18 is focused on a screen 19. The luminance controller 66 includes a luminance monitoring circuit (corresponding to previously-used reference numeral 21) and a luminance controlling circuit.

A unit of controlling operational characteristics of the LCLV 13 operates as follows. Before writing light enters the LCLV 13, a portion of the writing light is split by using the half mirror 63 disposed on the writing lens 12 side for a luminance measured value by the photosensor 15. An output signal from the sensor is transformed into a luminance signal by the luminance monitoring circuit of the luminance controller 66 and output to the luminance controlling circuit. The luminance controlling circuit calculates an attenuation amount of the writing luminance so as to match the photosensitivity of the LCLV 13 and outputs a controlling signal corresponding to the attenuation amount to the light attenuator 64. Since the light attenuator 64 can attenuate the writing luminance in response to the controlling signal, the most suitable operational characteristics of the LCLV 13 are obtained.

The rotating color filter 61 as the color separation unit provided on the writing side consists of red, green, and blue filters as three primary colors, and the rotating color filter 62 provided on the reading side consists of red, green, and blue filters (three primary color filters) and three light-shielding filters each of which is disposed between every pair of two primary color filters. The rotating color filters 61 and 62 provided on the writing side and on the reading side, respectively, are controlled such that filters of respective colors on the writing same and the reading side are synchronized. Speed of rotation thereof is also controlled.

A configuration of the LCLV 13 used in this example is the same as the one illustrated in FIG. 3. A surface stabilized ferroelectric liquid crystal display mode is used as an operational mode of the LCLV.

Also, a light attenuator or liquid crystal panel using an electro-optical effect of PLZT ceramic can be used as the light attenuator 64. Although a light attenuator is used in the present example, a luminance of writing light can be adjusted by using an automatic diaphragm of the writing lens instead.

Figure 6:
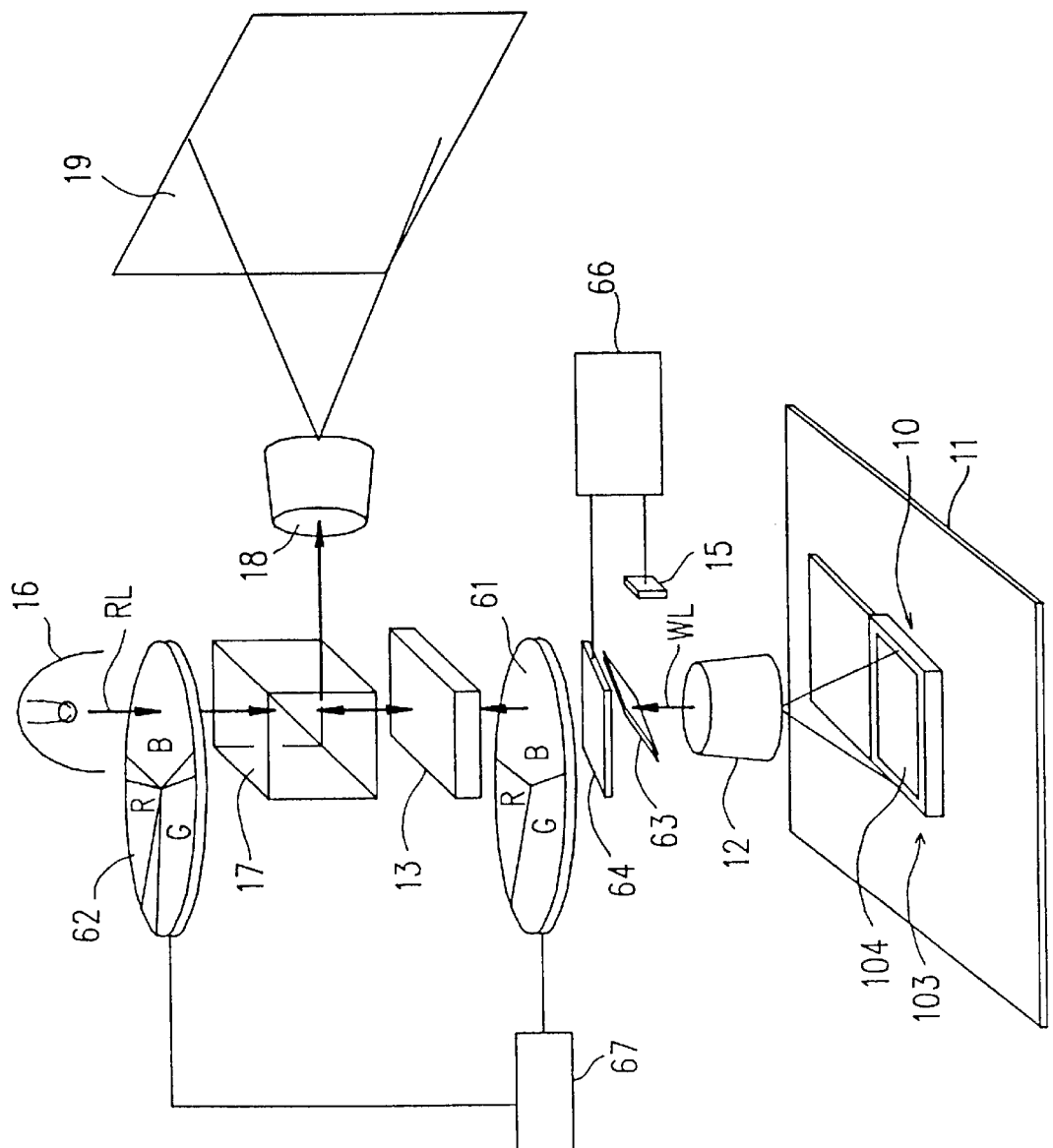
FIG. 6 illustrates a configuration of a liquid crystal display apparatus according to a second example of the present invention.
Figure 7:
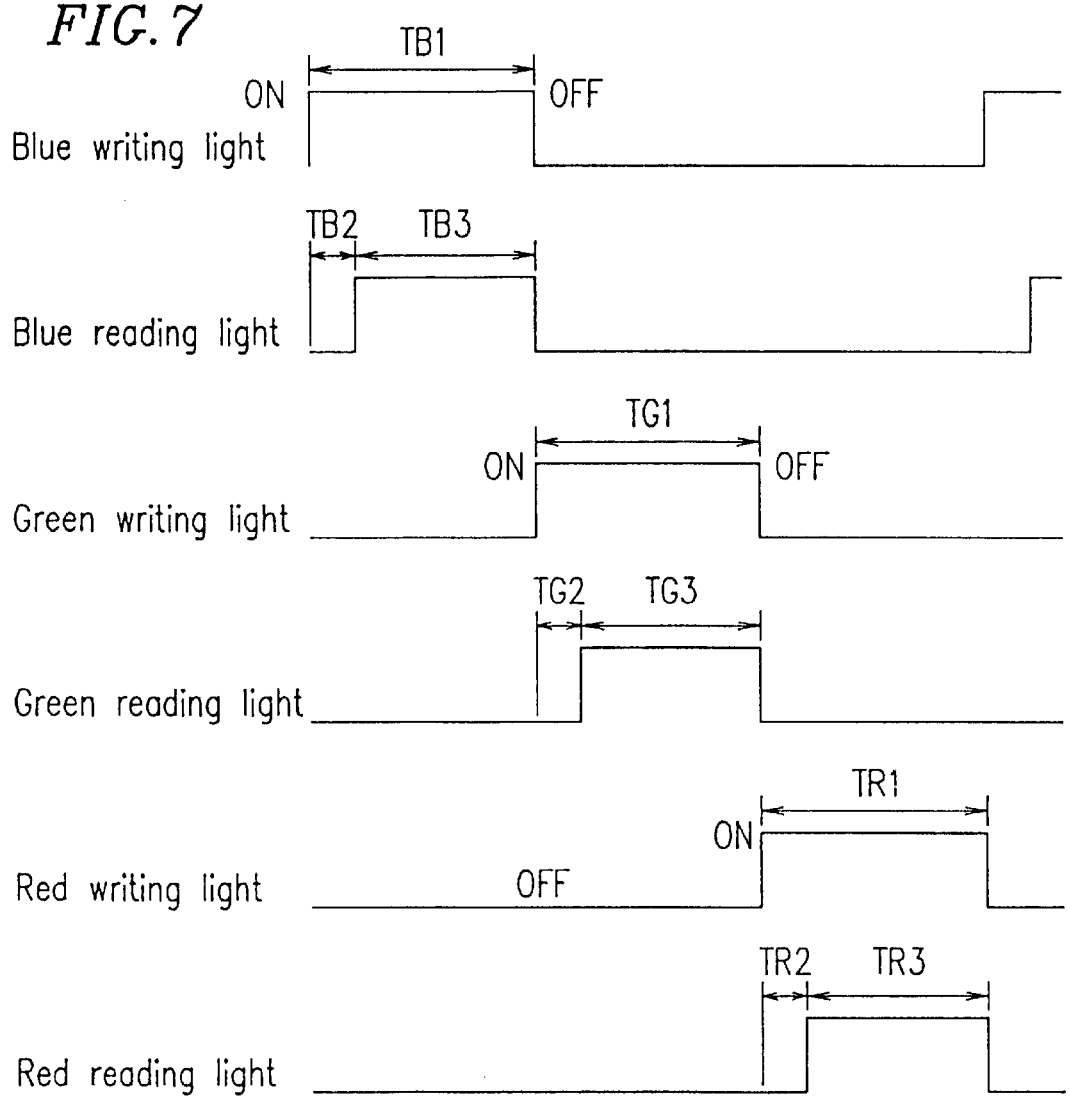
FIG. 7 is a diagram illustrating an example of operational timing for writing in and reading from the liquid crystal display apparatus of the second example.

In the liquid crystal display apparatus of the present invention having above-described configuration, writing light emitted from the display medium 10 (a screen image of the reflection type LCD 104) illustrated in FIG. 6 enters the writing lens 12. The writing lens 12 has a zoom mechanism and a focusing mechanism, and a magnification of the writing lens 12 is adjusted in accordance with a physical extent and a location of the display medium. Then, the writing light from the display medium 10 is separated into colors by the rotating color filter 61, and then is focused within a writing region of the LCLV 13 in the most suitable size. While this is being done, the luminance of writing light is adjusted by the luminance controller 66 so as to match the operational characteristics of the LCLV 13. Consequently, an excellent display which is bright and has high contrast is obtained.

Light emitted from the projection light source 16 made of a metal halide lamp is separated into colors by the rotating color filter 62 and enters the polarization beam splitter 17. A P-polarized light of this incident light passes through the beam splitter 17 and enters the LCLV 13. An S-polarized light is reflected at a right angle from the direction of propagation by the beam splitter 17. The light incident on the LCLV 13 is reflected by the dielectric mirror 35 of the LCLV 13. A part of this reflected light which passes through a region of the liquid crystal layer 38, whose orientation state has been changed by the writing of an image, undergoes a change of polarization direction due to the orientation state of the liquid crystal layer and becomes an S-polarized light. Consequently, the reflected light which is now made of the S-polarized light is reflected at a right angle from the direction of propagation by the beam splitter 17. Subsequently, the reflected light is enlarged by the projection lens 18 and, as a result, an image of the display medium 10 is projected and displayed on the screen 19.

A specific operation when color display is performed using the rotational color filters 61 and 62 is as follows. FIG. 7 illustrates an example of operational timing of writing in and reading from the LCLV 13 with respective colors using the rotational color filters 61 and 62. The rotational color filter 61 is rotated. Writing light from the display medium is directed to pass through the blue filter during a period TB1 and the writing in the LCLV 13 is performed with the blue light. When the writing is being performed, an on/off state of the liquid crystal layer of the LCLV 13 is stabilized after a certain period of time from the time of entrance of the writing light. Therefore, the color filters 61 and 62 provided on the writing and reading sides, respectively, are synchronized such that blue reading light starts entering the LCLV 13 when a time duration TB2 has passed since the start of the writing in blue, i.e., the blue reading light enters the LCLV 13 during a period TB3. Moreover, the rotational color filters 61 and 62 are synchronized such that tho blue reading light is turned off when the blue writing light is turned off at the end of the period TB1. This completes the projection in blue.

Next, a writing is performed with green light which passes through a green filter of the rotational color filter 61. An on/off state of the liquid crystal is stabilized after a certain period of time from the turning-off of blue writing light and the turning-on of green writing light. Therefore, the rotational filters 61 and 62 are synchronized such that green reading light starts entering the LCLV 13 when a time duration TG2 has passed since the start of the writing in green, i.e., the green reading light enters the LCLV 13 during a period TG3. Moreover, the rotational color filters 61 and 62 are synchronized such that the green reading light is turned off when the green writing light is turned off at the end of the period TG1. This completes a projection in green.

Next, a projection in red is performed by turning on and off red writing and reading light with similar timing. By successively repeating projections in blue, green, and red, a color projection display by field sequential method is realized. Furthermore, by constructing the rotational color filters 61 and 62 such that they can easily be taken out of optical paths of the writing light and the reading light either automatically or manually, a liquid crystal display apparatus which is capable of switching from a color display mode to a high luminescent black-and-white display mode and vice versa can be constructed.

As described above, the liquid crystal display apparatus of the present invention can realize a color display by synchronously driving the rotational color filters 61 and 62. Therefore, a color display of an image becomes possible by an addition of the minimum number of parts, and a liquid crystal color display apparatus can be constructed without a large increase in costs. Also, color display of both still pictures and moving pictures can be realized, and switching from a color display mode to a high luminescent black-and-white display mode and vice versa can also be conducted. Furthermore, when an image of the display medium 10 is written in the LCLV 13 using the writing lens 12, a luminance of writing light is adjusted so as to match the operational characteristics of the LCLV 13 by the luminance controller 66. Therefore, the writing luminance can be adjusted in accordance with a variety of display media such as luminescent and non-luminescent display media, and a projection of a bright image with excellent contrast can always be realized regardless of the kind of display medium.

Example 3

Still another example of the present invention will be described with reference to FIGS. 8 and 9. In order to facilitate the description, the same reference numerals are assigned to elements having the same functions as in the previous examples and the description thereof will be omitted.

A liquid crystal display apparatus of this example includes three light-addressed liquid crystal light valves (referred to as light-addressed LCLVs hereinafter) 13R, 13B, and 13G; a writing lens 12 for writing an image of a display medium 10 (here, a display screen of a reflection type LCD 104 of a portable information terminal 103 is illustrated as the display medium as an example) placed on a projection table 11 into the LCLVs 13R, 13B, and 13G; a color separation unit (e.g., dichroic prism) 81 for separating writing light into three primary color beams; a projection light source 16 as a reading unit; a dichroic prism 85 as color separation/ combination unit for separating light from the projection light source into three primary color beams and recombining them; a polarization beam splitter 17; and a projection lens 18. Light emitted from the projection lens 18 is focused on a screen 19.

Figure 8:
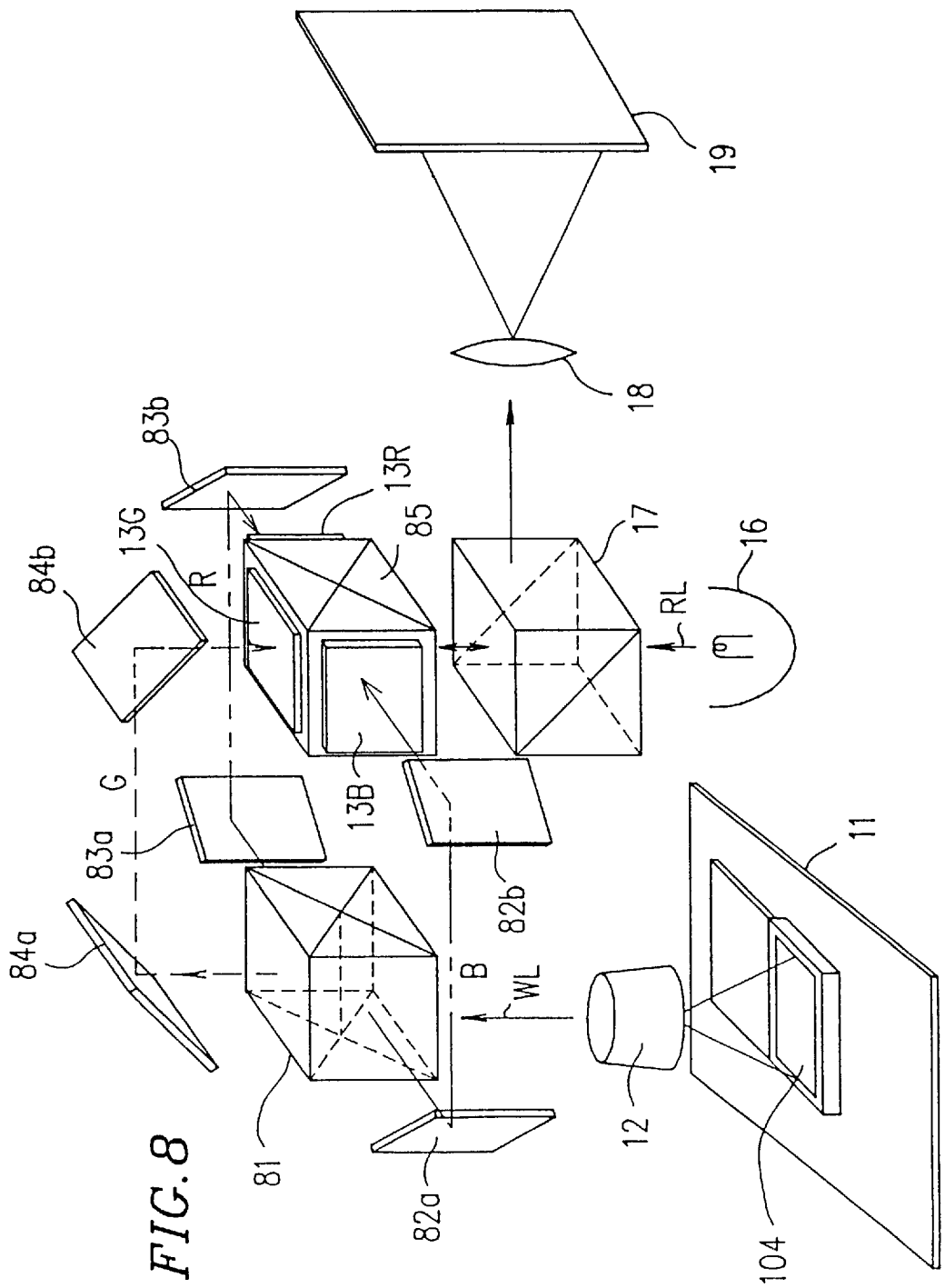
FIG. 8 illustrates a configuration of a liquid crystal display apparatus according to a third example of the present invention.

In the above-described configuration, writing light emitted from the display medium 10 (a display screen of the reflection type LCD 104 in this example) illustrated in FIG. 8 enters the writing lens 12. The writing lens 12 includes a zoom mechanism and a focusing mechanism. By adjusting a magnification of the writing lens 12 in accordance with the physical extent and location of the display medium 10, the writing light from the display medium 10 is focused in writing regions of the three LCLVs 13R, 13B, and 130 in the most suitable size through the color separation unit 81 which separates the writing light from the display medium 10 into three primary color beams. When the image is written in the LCLVs, a luminance of writing light, a frequency or an amplitude of drive voltage for the LCLVs is adjusted by operational characteristics controlling unit (not shown in the figure) of the LCLVs 13R, 13B, 13G such that a bright and excellent display with good contrast can be obtained. In FIG. 8, optical components are illustrated apart from each other in order to facilitate the understanding of a configuration of the liquid crystal display apparatus.

A specific operation when the writing of an image in the LCLVs through the color separation unit 81 is as follows. Light coming from the writing lens 12 is separated into blue, green, and red light beams by the dichroic prism 81 which separates light into three primary color beams. The blue and red light beams are reflected at a right angle by the prism but the green light beam passes through. The blue light beam which is reflected at the dichroic prism 81 is reflected at total reflection mirrors 82a and 82b and is written in the LCLV for blue 13B. Similarly, the reflected red light beam is reflected at total reflection mirrors 83a and 83b and written in the LCLV for red 13R. The green light beam which passes through is reflected at total reflection mirrors 84a and 84b and is written in the LCLV for green 130. The apparatus is designed such that lengths of optical paths from the writing lens 12 to respective LCLVs 13R, 131, and 13G are all the same.

On the other hand, light emitted from the projection light source 16 made of a metal halide lamp enters the polarization beam splitter 17. An S-polarized light of this incident light is reflected at a right angle from the direction of propagation by the beam splitter 17. A P-polarized light passes through the beam splitter 17 and then is separated into red, green, and blue light beams by the dichroic prism 85 which separates light into three primary color beams. The red, green, and blue light beams then enter the LCLVs for red, green, and blue 13R, 13G, and 13B, respectively. These incident light beams are reflected by the dielectric mirrors 35 of the respective LCLVs 13R, 13G, and 13B and recombined through the dichroic prism 85 which combines three primary color beams. A part of the reflected light which passes through a region of the liquid crystal layer 38, where an orientation state has been changed due to the writing of an image, changes its polarization direction due to the orientation state of the liquid crystal layer and becomes an S-polarized light. Consequently, after passing through the dichroic prism 85 which serves as a color separation/ combination unit, the S-polarized light is reflected at a right angle from the direction of propagation by the beam splitter 17. Later, this reflected light is enlarged by the projection lens 18, thereby projecting the image of the display medium 10 on the screen 19 and realizing a color display of the image, Lengths of optical paths from the surfaces on the reading side of the liquid crystal layers of the LCLVs 13R, 13G, and 13B for respective colors to the projection lens 18 are designed to be the same. Also, although the S-polarized light which is separated by the beam splitter 17 is not used as reading light, it can be used as auxiliary illuminating light by an optical system which is not shown in the figure. By utilizing the separated beam, it makes possible to omit a light source for illuminating non-luminescent display media, (e.g., paper, OHP transparent sheet etc.). In a case where an OHP transparent sheet is used as the display medium, by providing a diffusive reflector under the transparent sheet, a projection display can be conducted by using the separated beam.

Figure 9:
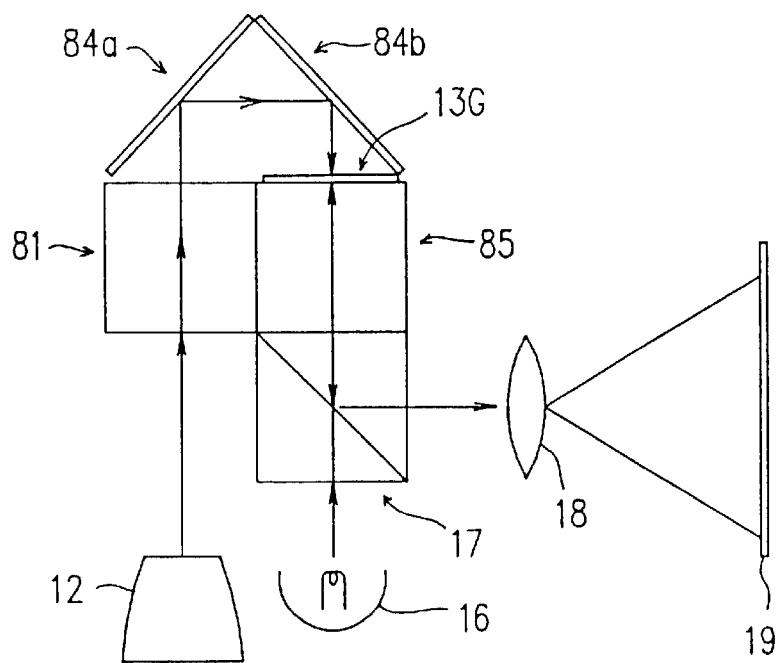
FIG. 9 is a diagram illustrating an actual optical system for green light in the liquid crystal display apparatus of FIG. 8.
Figure 10:
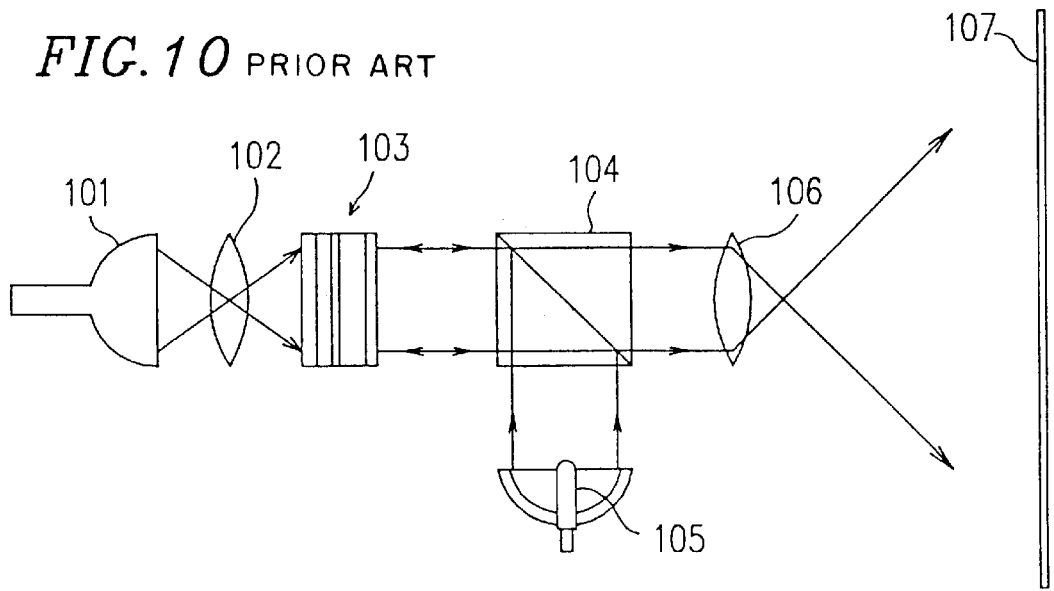
FIG. 10 is a diagram illustrating a configuration of a conventional projection type display.
Figure 11:
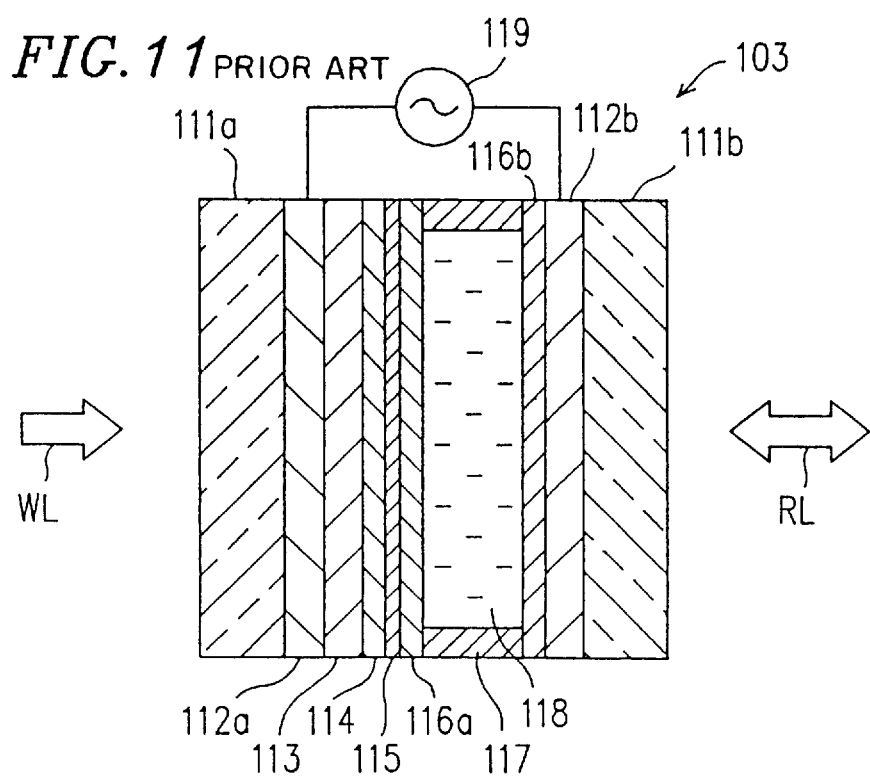
FIG. 11 is a cross-sectional view of a conventional liquid crystal light valve.
Figure 12:
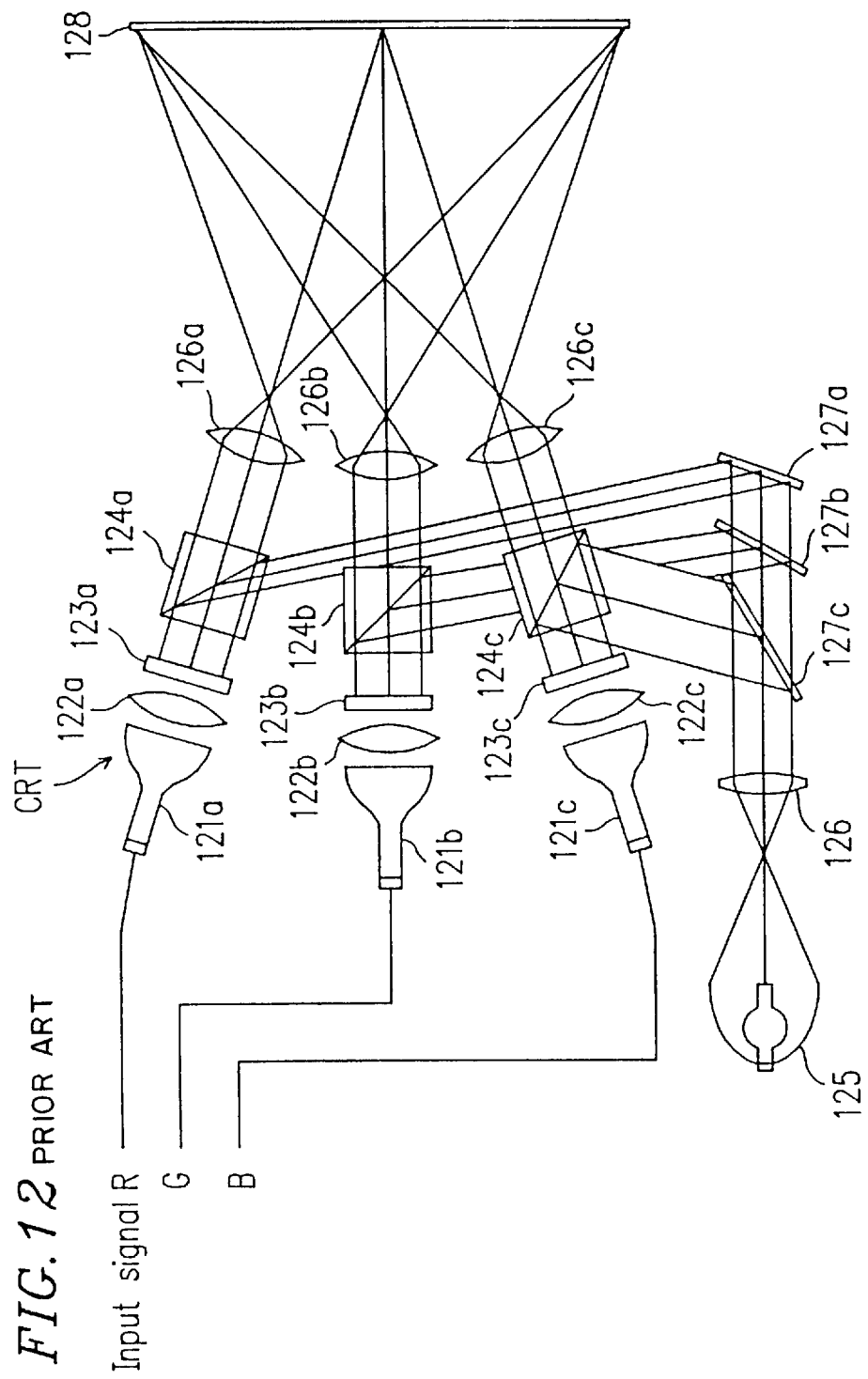
FIG. 12 is a diagram illustrating a configuration of a conventional apparatus for color projection display.

FIG. 9 illustrates a configuration of an actual green optical system. The dichroic prism 81 for color separation, the dichroic prism 85 for color separation/combination, and the polarization beam splitter 17 are disposed side by side. The total reflection mirrors 84a and 84b are also provided so as to minimize the optical path length. In order to prevent reading light from coming around to the writing side of the LCLV for green 130, the reading side and the writing side are separated by a light-shielding plate which is not shown in the figure. By disposing the respective optical parts as above, a considerably compact liquid crystal display apparatus can be realized even when three LCLVs are used.

As described above, the liquid crystal display apparatus of the present example is capable of successively displaying color images by using a color separation/combination unit for three primary colors, and the optical system thereof becomes compact. Consequently, a liquid crystal color display apparatus which is compact and capable of producing a very bright image can be constructed. Also, if a liquid crystal TV or the like is used as a display medium, color display of both still pictures and moving pictures can be realized. Furthermore, when an image of the display medium 10 is written in the LCLVs 13R, 130, and 13B using the writing lens 12, a luminance of writing light is adjusted by the luminance controller 66 as to match the characteristics of the LCLVs 13R, 13G, and 13B and, consequently, the luminance of writing light can be adjusted in accordance with the brightness of a variety of display media such as luminescent and non-luminescent displays. As a result, a projection of an image which is always bright and has excellent contrast can be realized regardless of the kind of display media.

Although color separation and recombination is performed by the dichroic prism 85 as a color separation/combination unit in the third example, a configuration where the color separation and recombination are performed by separate unit can be used. For example, the apparatus can have a configuration where a couple of dichroic prisms, one of which is used as the color separation unit and the other of which is used as the color recombination unit, are used.

Accordingly, the present invention makes possible the advantages of (1) providing a liquid crystal display apparatus which is capable of projecting an image of a display medium of any kind without limitations regarding the display medium, and (2) providing a liquid crystal display apparatus which is capable of projecting large and bright displays both in black-and-white and in color. The liquid crystal display apparatus of the invention is suited to a projection display, a display for presentation, an overhead projector, or the like.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A liquid crystal apparatus, comprising:
    a light-addressed liquid crystal light valve including a photoconductive layer and a liquid crystal layer between a pair of light transmitting substrates, each of the light transmitting substrates having an electrode for applying a voltage across the photoconductive layer and the liquid crystal layer;
    writing means for writing an image of a display medium in the light-addressed liquid crystal light valve with writing light from the display medium through a writing lens;
    projecting means for projecting the image written in the light-addressed liquid crystal light valve by irradiating reading light from a projection light source to the light-addressed liquid crystal light valve; and
    color separating means for separating the writing light and the reading light into three primary color beams in a time dividing manner, wherein the color separating means comprises at least two rotating color filters, the rotating color filters each including three primary color filters, each of the rotating color filters being synchronized with each other.

2. A liquid crystal display apparatus, comprising:
    a light-addressed liquid crystal light valve including a photoconductive layer and a liquid crystal layer between a pair of light transmitting substrates, each of the light transmitting substrates having an electrode for applying a voltage across the photoconductive layer and the liquid crystal layer;
    writing means for writing an image of a display medium in the light-addressed liquid crystal light valve with writing light from the display medium through a writing lens;
    projecting means for projecting the image written in the light-addressed liquid crystal light valve by irradiating reading light from a projection light source to the light-addressed liquid crystal light valve;
    color separating means for separating the writing light and reading light into three primary color beams, wherein the color separating means comprises at least two rotating color filters, the rotating color filters each including three primary color filters, each of the rotating color filters being synchronized with each other; and
    color combining means for combining three primary color beams reflected by the light-addressed liquid crystal light valve.

* * * * *